US008369205B2

United States Patent
Stolle et al.

(10) Patent No.: US 8,369,205 B2
(45) Date of Patent: Feb. 5, 2013

(54) DETERMINING INFORMATION INDICATING A LENGTH OF A PART OF A FIRST CABLE

(75) Inventors: Reinhard Stolle, Oberhaching (DE); Thyagarajan Umashankar, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1489 days.

(21) Appl. No.: 11/645,116

(22) Filed: Dec. 22, 2006

(65) Prior Publication Data
US 2008/0151742 A1 Jun. 26, 2008

(51) Int. Cl.
*H04J 1/12* (2006.01)
*G01R 31/08* (2006.01)

(52) U.S. Cl. .................... 370/201; 370/252
(58) Field of Classification Search ............ 370/201, 370/252
See application file for complete search history.

(56) References Cited

U.S. PATENT DOCUMENTS

| | | | |
|---|---|---|---|
| 6,633,545 B1* | 10/2003 | Milbrandt | 370/252 |
| 6,981,186 B2* | 12/2005 | Ginesi et al. | 714/717 |
| 7,072,391 B2* | 7/2006 | Oksman et al. | 375/222 |
| 7,224,672 B2* | 5/2007 | Arai | 370/252 |
| 7,302,379 B2* | 11/2007 | Cioffi et al. | 703/20 |
| 7,613,236 B2* | 11/2009 | Oksman et al. | 375/222 |
| 7,664,254 B2* | 2/2010 | Bostoen et al. | 379/417 |
| 2003/0086514 A1 | 5/2003 | Ginis et al. | |
| 2004/0114503 A1 | 6/2004 | Schneider et al. | |
| 2006/0171477 A1 | 8/2006 | Carballo et al. | |
| 2007/0208537 A1* | 9/2007 | Savoor et al. | 702/182 |

OTHER PUBLICATIONS

Krista Jacobsen, Methods of Upstream Power Backoff on Very High-Speed Digital Subscriber Lines, Mar. 2001, pp. 210-216, IEEE.
ITU-T Recommendation G.993.1, "Very high speed digital subscriber line", Jun. 2004, pp. 12, 117, 210-211 (4 pages).
ITU-T Recommendation G.993.2, "Very high speed digital subscriber line 2", Feb. 2006, pp. 36-37, 49-50, 149-170, 247 (27 pages).
ITU-T Recommendation G.997.1, "Physical layer management for digital subscriber line (DSL) transceivers", May 2003, pp. 39, 42, 60, 101-103 (6 pages).
T1E1.4/2003—210R1, "Very-high-bit-rate Digital Subscriber Line (VDSL) Metallic Interface", ANSI T1.424, 2004, pp. 18-19, 130 (3 pages).
TS 101 270-1 V2.0.10 (May 2003), "Transmission and Multiplexing (TM); Access transmission systems on metallic access cables; Very high speed Digital Subscriber Line (VDSL); Part 1: Functional requirements", May 2003, pp. 28-29, 46, (3 pages).

* cited by examiner

*Primary Examiner* — Mark Rinehart
*Assistant Examiner* — Angel Brockman
(74) *Attorney, Agent, or Firm* — SpryIP, LLC

(57) ABSTRACT

A device for determining an information indicating a length of a part of a first cable, the first cable connecting a first transceiver unit and a first subscriber device, wherein the part of the first cable extends from the first transceiver unit to a point of the first cable from where a second cable, which connects a second transceiver unit to a second subscriber device, joins the first cable to extend from the second transceiver unit to the second subscriber device, the device comprising an input to couple the device to the second cable, a first apparatus coupled to the input to measure a quiet line noise related to crosstalk from the first cable to the second cable, and a second apparatus to determine information indicating the length of the part of the first cable based on the quiet line noise.

44 Claims, 3 Drawing Sheets

DETERMINING INFORMATION INDICATING A LENGTH OF A PART OF A FIRST CABLE

BACKGROUND

Due to the plurality of pairs of wires in a telephone cable from a central office (CO) or from a transceiver unit within the CO to connected subscribers or subscriber devices, respectively, crosstalk occurs despite a direct current insulation of the pairs of wires, both near-end crosstalk (NEXT) and also far-end crosstalk (FEXT). The same results from capacitive or inductive couplings. By twisting the individual pairs of wires of a cable, this crosstalk is minimized so far that it may be neglected in the voice band. In data transmission technologies, like e.g. DSL technology, however, apart from the voice band further frequency ranges are used, in which this crosstalk has a very strong effect on the possible range and transmission speed.

Near-end crosstalk means, that a transmitter on the "near side" of a receive device, i.e. both receive device and also transmitter are part of different subscriber terminal devices or both receive device and also transmitter are part of the central office, couples transmit signal portions into the receive branch of the receive device.

In contrast to that, far-end crosstalk means, that, in addition to the receive signal determined for the same, sent from a far-end first transmitter, i.e. first transmitter and receiver are on different sides of subscriber and central office side, a receiver receives portions of a second transmit signal sent from a far-end second transmitter, i.e. also second transmitter and receiver are on different sides.

In an xDSL network, wherein "x" stands for different implementations of DSL technology, the subscriber devices (CPE=customer premises equipment) are typically provided in a different distance from the central office (CO). A so-called near-far problem results from this. If all subscriber devices of the network transmitted with the same transmit power spectral density (TX-PSD, transmit power spectral density), the CPEs closer to the CO would respectively couple a high amount of crosstalk into the lines of the CPE further away from the CO and thus cause differently strong interference power spectral densities of the individual subscribers.

It is sometimes the case, that in an xDSL network ADSL lines (ADSL=asymmetric digital subscriber line) are provided together with VDSL lines (VDSL=very high speed digital subscriber line) in cable bundles. Due to higher data rates of VDSL systems, VDSL central offices are generally installed closer to the corresponding connected VDSL subscribers than comparable ADSL central offices with regard to their connected ADSL subscribers. The lines respectively starting from the central offices are combined in cable bundles and led in parallel at the end of the subscriber side for a few hundred meters, so that, for example, newly installed VDSL systems generate interferences by cross-talk on existing ADSL lines.

For this reason, within the scope of VDSL standardization (VDSL=very high-speed digital subscriber line)(see ITU-Standards G.993.1, G.993.2, G.997, ANSI-Standard T1.424-2004, ETSI-Standard TS101-270), a so-called Downstream Power Back-Off (DPBO) is defined. This is a method for protecting existing ADSL lines. It is the aim of the DPBO to form a transmit power spectral density (TX-PSD) at the VDSL central office side, such that the interference power spectral density caused by a VDSL wire pair on an ADSL subscriber side by far-end cross-talk comprises the same value as the FEXT-PSD generated at the same ADSL subscriber by a neighboring ADSL wire pair.

The indicated standards define a method which approximates the request for a respectively equal interference power density of the wire pairs at the CO by realizing the respectively equal receive power spectral density (RX-PSD). By this approximation, subscribers on shorter lines cause a lower FEXT-PSD than subscribers on longer lines. This disadvantage may be avoided by a correction value. The correction value depends on an electrical length or attenuation (EL, in dB), respectively, of the ADSL lines on a line length according to the distance between the ADSL central office and the VDSL central office, and on the electrical length or attenuation (CL, in dB), respectively, of the VDSL lines between the VDSL central office and the VDSL subscribers. Hence, EL corresponds to an information indicating a length of a part of an ADSL cable, the ADSL cable connecting an ADSL transceiver unit and an ADSL subscriber device, wherein the part of the ADSL cable extends from the ADSL transceiver unit to a point of the ADSL cable from where a VDSL cable via which a VDSL transceiver unit is connected to a VDSL subscriber device, joins the ADSL cable to extend to the VDSL subscriber device. Thereby the ADSL- and VDSL transceiver units can, for example, reside in ADSL- and VDSL central offices, respectively. To the TX-PSD in dBm/Hz determined according to the standardized method, a correction value $$a_{corr} = 10 \cdot \log_{10}\left(1 + \frac{EL}{CL}\right) \text{dB} \qquad (1)$$

is added. The line attenuations or electrical lengths EL and CL, respectively, may alternatively also be indicated in meters, as the ratio EL/CL does not depend on that.

The configuration parameter EL, also referred to as DPBOESEL in the aforementioned standards, defines the assumed electrical length of cables (E-side cables) connecting exchange based DSL services to a remote flexibility point (cabinet), that hosts the xTU-C (xDSL Transmission Unit-Central) that is subject to spectrally shaped downstream power back-off depending on this length DPBOESEL. For this parameter DPBOESEL the electrical length is defined as the loss (dB) of an equivalent length of hypothetical cable at a reference frequency defined by the network operator or in spectrum management regulations. According to the aforementioned standards, DPBOESEL shall be coded as an unsigned integer representing an electrical length from 0 dB to 255.5 dB in steps of 0.5 dB. All values in the range are valid. If DPBOESEL is set to zero, the DPBO in this section shall be disabled.

SUMMARY

A first embodiment of invention is a device for determining information indicating a length of a part of a first cable. The first cable connects a first transceiver unit and a first subscriber device, wherein the part of the first cable extends from the first transceiver unit to a point of the first cable from where a second cable via which a second transceiver unit is connected to a second subscriber device, joins the first cable to extend to the second subscriber device. The device includes an input, a first apparatus and a second apparatus. The input couples the device to the second cable. The first apparatus is coupled to the input to measure a quiet line noise related to crosstalk from the first cable to the second cable. The second apparatus determines information indicating the length of the part of the first cable based on the quiet line noise.

BRIEF DESCRIPTION OF THE SEVERAL VIEWS OF THE DRAWINGS

In the following, embodiments of the present invention are explained in more detail with reference to the accompanying drawings, in which.

DETAILED DESCRIPTION

Figure 1:
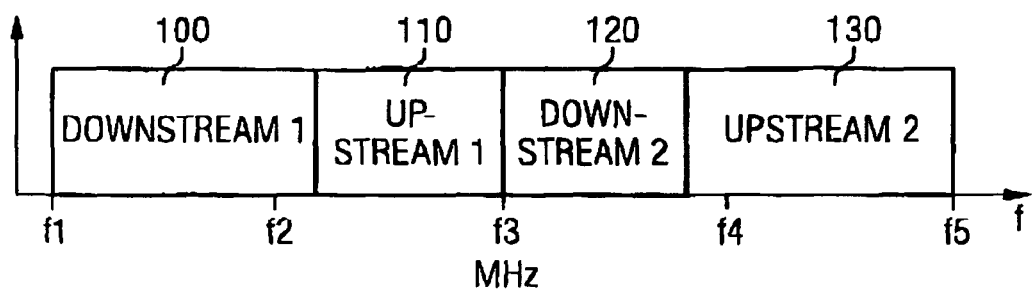
FIG. 1 shows a schematic illustration of a VDSL frequency plan.

With regard to the following description it should be noted, that in the different embodiments equal or equally operating functional elements may have the same reference numerals and thus the descriptions of functional elements with same reference numerals are exchangeable in the different embodiments illustrated in the following.

FIG. 1 shows the division of the frequency spectrum into individual bands according to the VDSL standard, to make the following embodiments of a DPBO scenario clearer and in particular to simplify the understanding according to which criteria the electrical length DPBOESEL of a part of a first cable is determined in embodiments of the present invention.

FIG. 1 shows an illustration of a relevant frequency range, which is divided into four different subfrequency bands. The division of the frequency range corresponds to that of the VDSL transmission technology. A first frequency range 100 defines a first frequency band for the downstream, i.e. the transmission direction from CO to CPE. A second higher-frequency frequency range 110 defines a first frequency band for the upstream data transmission, i.e. the direction from CPE to CO. A next higher-frequency frequency range 120 forms a second frequency subband for the downstream data transmission. Finally, the highest-frequency frequency range 130 forms a second frequency subband for the upstream data transmission. However, at least some embodiments of the present invention are also applicable with other transmission technologies apart from VDSL, for example systems with more upstream and downstream bands, as it for example occurs in VDSL2, where for downstream and upstream currently respectively up to three frequency bands are used. As it may be seen from the bandwidths of the individual subbands, in the respective subbands differently high transmission rates may be obtained. Thus, for example in the downstream frequency band 100 (DS1), higher data rates may be obtained than in the downstream frequency band 120 (DS2). The respectively used bandwidths within the subbands DS1 and DS2 depend on the respective line attenuation between CO and CPE.

Discrete multitone transmission (DMT) is the designation for the modulation method used in VDSL. DMT is a multi-carrier method, in which the bit information is encoded onto several carrier frequencies for data respectively comprising a certain bandwidth. The serial data stream to be transmitted is combined at the transmit side in DMT to a respective number of bits and mapped to complex subsymbols by inverse spectral transformation, which are sent in parallel on many neighboring carriers. For this purpose, they are simultaneously modulated onto the available carrier frequencies whose sum signal is then transmitted. The carriers may be adjusted to be differently strong. By this it becomes possible to compensate the non-ideal frequency response of concrete telephone lines. Each carrier may be modulated with another bit density, depending on how noisy it is. For example, the carriers with lower frequencies, where the interferences are usually less, may be modulated with a higher data rate, the carriers with higher frequencies with a correspondingly lower data rate. In extreme cases, individual carriers may also be completely blocked.

Figure 2:
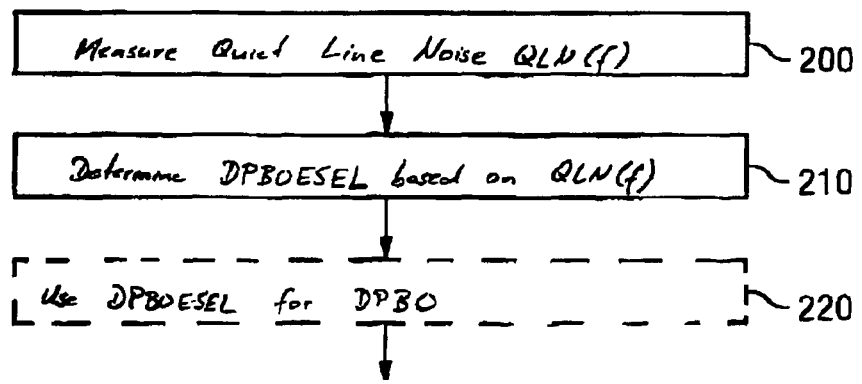
FIG. 2 shows a flow chart for illustrating a method for determining an information indicating a part of a length of a first cable according to an embodiment of the present invention.

FIG. 2 shows a flow chart for illustrating a procedure for determining the information DPBOESEL indicating a length of a part of an ADSL cable, the ADSL cable connecting an ADSL transceiver unit and an ADSL subscriber device, wherein the part of the ADSL cable extends from the ADSL transceiver unit to a point of the ADSL cable from where a VDSL cable via which a VDSL transceiver unit is connected to a VDSL subscriber device, joins the ADSL cable to extend to the VDSL subscriber device, according to an embodiment of the present invention. Thereby the ADSL- and VDSL transceiver units or modems can, for example, reside in ADSL- and VDSL central offices, respectively.

In a first step S200, the VDSL transceiver unit or VDSL central office (VDSL-CO) measures a quiet line noise QLN(f) present on a VDSL cable in the absence of VDSL signals between the VDSL transceiver unit or VDSL-CO and the VDSL subscriber device. Quiet line noise QLN(f) occurs due to a cross-talk from ADSL cables to the VDSL cable at the point from where the VDSL transceiver unit or VDSL-CO is connected to the VDSL subscriber device.

In a second step S210, the VDSL-CO determines the parameter DPBOESEL, which is indicating the length of the part of the ADSL cable. Thereby, the determination of DPBOESEL is based on the quiet line noise QLN(f).

In a third optional step S220, the determined DPBOESEL can be, for example, used for a determination of a transmit power spectral density for a VDSL subscriber.

Figure 3:
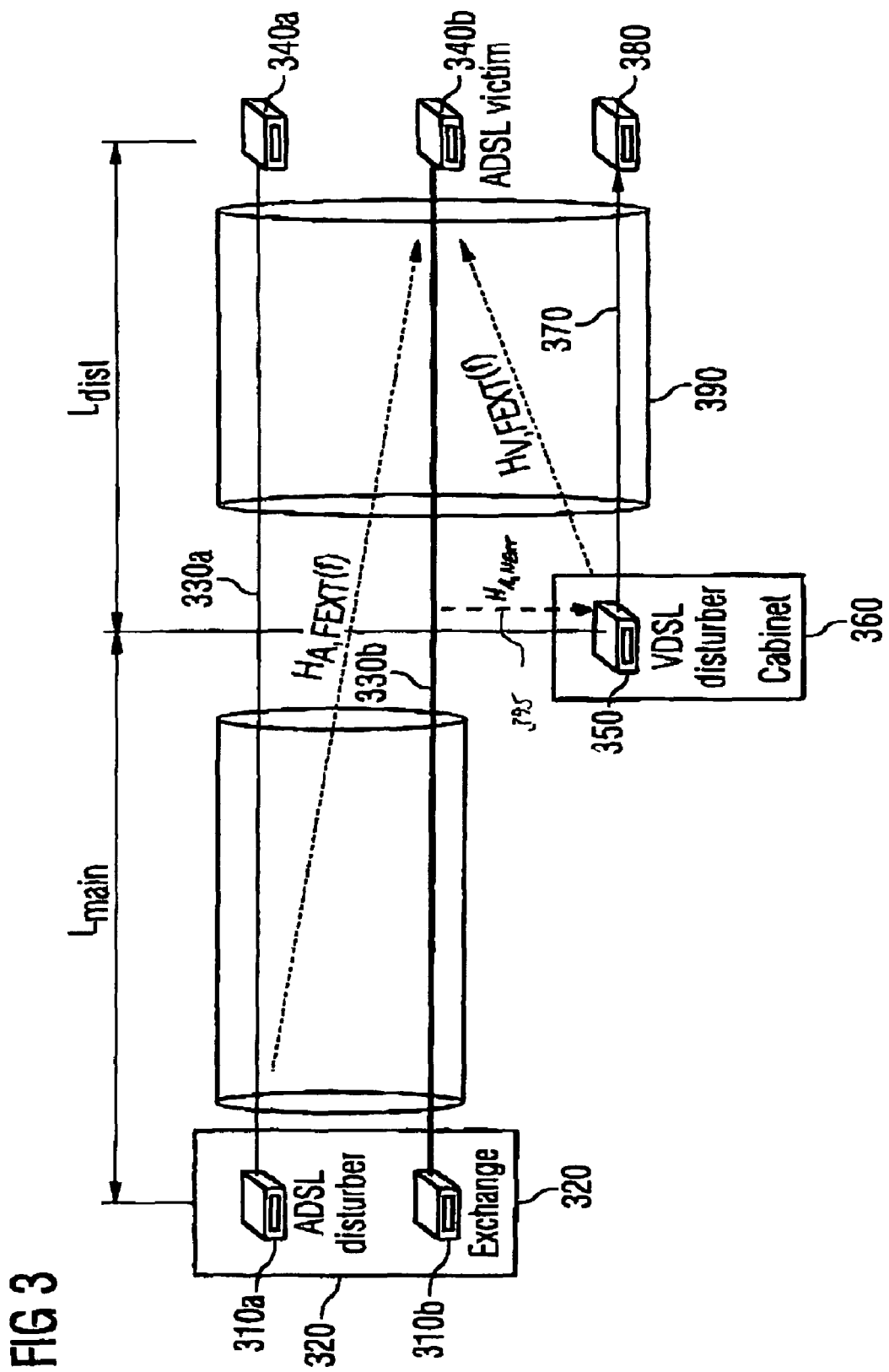
FIG. 3 shows a schematic illustration of a combined ADSL/VDSL network in which embodiments of the present invention may be implemented.

FIG. 3 shows a combined ADSL/VDSL network as an example for an application case of a DPBOESEL determination according to an embodiment of the present invention.

Each of a plurality of modems or transceiver units 310 of an ADSL central office 320 (ADSL-CO) is connected to a different one of a plurality of different ADSL subscriber devices or ADSL terminal devices 340 (ADSL-CPE), respectively, via one of a plurality of wire pair lines 330. In addition, each of a plurality of modems or transceiver units 350 of a VDSL central office 360 (VDSL-CO) is connected to a different one of a plurality of different VDSL subscriber devices or VDSL terminal devices 380 (VDSL-CPE), respectively, via a plurality of wire pair lines 370. The VDSL central office 360 is in a distance $L_{main}$ from the ADSL central office 320. Both the ADSL terminal devices 340 and also the VDSL terminal devices 380 are in a distance $L_{dist}$ from the VDSL central office 360, i.e. the ADSL terminal devices 340 ($L_{main}+L_{dist}$) are remote from the ADSL central office 320.

Since any wire pairs, i.e. ADSL and VDSL wire pairs, as indicated by reference numerals 390 in FIG. 3, are located on a section of $L_{dist}$ in a multiple-pair cable bundle 390, in the downstream, i.e. the communication in the direction towards the subscriber devices 340, 380, from the COs 320, 360, the already described far-end cross-talk results (FEXT). This is illustrated as an example in FIG. 3 for a line 330b of the ADSL subscriber device 340b. The transmit signal of the VDSL subscriber 380, i.e. CPE$_0$, with a transfer function H$_{V,FEXT}$(f) couples at the length L$_{dist}$ onto the line 330b of the ADSL subscriber 340b. Likewise, the transmit signal of the ADSL subscriber 340a couples across the complete ADSL line length (L$_{main}$+L$_{dist}$) with the transfer function H$_{A,FEXT}$(f) onto line 330b of the ADSL subscriber 340b.

Although it is not indicated in FIG. 3, each modem 350 of the VDSL-CO 360 and each of the VDSL subscriber devices 380 of the network of FIG. 3 includes a transmitter, a receiver and a processor, wherein the functioning and interaction of those internal components and thus also the functioning of the modems 350 and devices 380 themselves in connection with the adjustment of the transmit power density or the downstream power back-off, respectively, may be understood from the following description. It is the aim of the downstream power back-off (DPBO) to reduce the far-end crosstalk of the VDSL lines 380 onto the longer ADSL lines 330. Assuming, a transmission to ADSL subscribers 340b would take place with a maximum transmit power spectral density PSD$_{ADSL}$(f) from the ADSL-CO 320, then its transmit signal would be substantially attenuated already across the line length L$_{main}$. In a distance L$_{main}$ from the ADSL-CO 320, now the VDSL signal for VDSL subscribers 380 would start to couple over into the line of the ADSL subscriber 340b. If now also to the VDSL subscriber 380 a transmission with maximum transmit power spectral density PSD$_{ADSL}$(f) would be performed, then its transmit power spectral density in the distance L$_{main}$ to the ADSL-CO 320 would be substantially higher than that of the already attenuated ADSL signal of the ADSL subscriber 340b. This means that the far-end crosstalk of the VDSL subscriber 380 onto the ADSL subscriber 340b is higher than the far-end cross-talk of the ADSL subscriber 340a to the ADSL subscriber 340b. Due to the greater interference on the line of the ADSL subscriber 340b, the same may only be offered at a lower data rate as compared to the scenario without VDSL subscriber 380. In order to prevent this and in order to be able to offer the same data rate to any ADSL subscribers, the transmit power spectral density for the VDSL subscribers 380 connected to shorter VDSL lines at the VDSL-CO 360 has to be reduced, so that the request for a respectively equal interference power spectral density may be achieved at the ADSL subscribers 340. This reduction of the transmit power spectral density for the respective VDSL subscribers is—as already described—referred to as Downstream Power Back-Off DPBO.

A transmit power spectral density for a VDSL subscriber can be computed according to $$PSD_{DPBO}(f) \le PSD_{ADSL}(f) - a_{main}(f) + 10 \cdot \log_{10}\left(1 + \frac{a_{main}(f_{ref})}{a_{dist}(f_{ref})}\right), \quad (2)$$

wherein PSD$_{DPBO}$(f) corresponds to the shaped transmit power density of the VDSL subscriber, PSD$_{ADSL}$(f) to the transmit power density of the ADSL system, a$_{main}$(f$_{ref}$) to the attenuation of an ADSL cable with length L$_{main}$ between the ADSL central office 320 and the VDSL central office 360 and a$_{dist}$(f$_{ref}$) to the attenuation coefficient of the VDSL cable at a reference frequency f$_{ref}$, respectively.

As can be seen from the above equation, the parameter a$_{main}$(f$_{ref}$) is needed for the calculation of the transmit power spectral density PSD$_{DPBO}$(f).

According to the ITU standard G.997, the cable attenuation a$_{main}$(f) may be approximated with three parameters A', B' and C' according to $$a_{main}(f, L_{main})=(A'+B'\cdot\sqrt{f}+C'\cdot f)\cdot L_{main} \quad (3)$$

The parameters A', B' and C' are usually selected such that the frequency f may be indicated in MHz and the line length L$_{main}$ in kilometers. For a certain cable, for example, the parameters
A'=1,
B'=17.2 and
C'=0.62
result. Further, according to the ITU standard G.997, for the cable attenuation a$_{main}$(f) a similar formula may be given according to $$a_{main}(f, DPBOESEL)=(A+B\cdot\sqrt{f}+C\cdot f)\cdot DPBOESEL \quad (4)$$

The parameter DPBOESEL stands for the attenuation of the cable in dB with a frequency f=1 MHz and is designated as the electrical length, i.e. the electrical length DPBOESEL corresponds to $$DPBOESEL=a_{main}(1 \text{ MHz}, 1 \text{ km})=A'+B'+C'. \quad (5)$$

Further, the coefficients A, B, C may be determined from the coefficients A', B', C', respectively, by a division of A', B', C' by (A'+B'+C'). The coefficients for the above cable result according to G.997 to be
A=0.0531,
B=0.9139 and
C=0.0329.

It is possible to determine DPBOESEL from a measurement of the quiet line noise QLN(f), which is due to a crosstalk, in particular, a near-and-crosstalk, from an ADSL cable 330b to a VDSL cable 370 at the point from where the VDSL-CO 360 is connected to the VDSL subscriber device 380. The near-and-crosstalk is indicated by the reference numeral 395 in FIG. 3.

Therefore, according to embodiments of the present invention, a VDSL-CO 360 comprises a device for determining an information DPBOESEL indicating a length L$_{main}$ of a part of an ADSL cable, the ADSL cable connecting a ADSL transceiver unit 310b and an ADSL subscriber device 340b, wherein the part of the ADSL cable 330b extends from the ADSL transceiver 310b unit to a point of the ADSL cable from where a VDSL cable 370, which connects a VDSL transceiver unit 350 to a VDSL subscriber device 380, joins the ADSL cable 330b to extend from the VDSL transceiver unit 350 to the VDSL subscriber device 380. The device comprises an input to couple the device to the VDSL cable 370, a first apparatus coupled to the input to measure a quiet line noise QLN(f) related to crosstalk from the ADSL cable 330b to the VDSL cable 370, and a second apparatus to determine information DPBOESEL indicating the length L$_{main}$ of the part of the ADSL cable 330b based on the quiet line noise QLN(f).

The ITU-T recommendation G.997.1 allows for a measurement of the quiet line noise QLN(f) during a so-called O-P-Quiet stage of a channel discovery phase, during the initialization of a communication link between the VDSL-CO 360 and the VDSL subscriber device 380. Thereby, QLN(f) can be measured at N different frequencies or reference frequencies f$_{ref,n}$ (n=1, . . . , N), resulting in a vector QLN(f$_{ref}$), with f$_{ref}$=(f$_{ref,1}$, f$_{ref,2}$, . . . , f$_{ref,N}$)$^T$ and QLN(f$_{ref}$)=(QLN(f$_{ref,1}$), QLN(f$_{ref,2}$), . . . , QLN(f$_{ref,N}$))$^T$. According to an embodiment of the present invention, the value of the DPBOESEL is obtained from the vector QLN(f$_{ref}$) as a solution to a linear equation system.

The measured vector QLN(f$_{ref}$) depends on a vector PSD$_{ADSL}$(f$_{ref}$)=(PSD$_{ADSL}$(f$_{ref,1}$), PSD$_{ADSL}$(f$_{ref,2}$), . . . , PSD$_{ADSL}$(f$_{ref,N}$))$^T$ of the transmit power spectral density of the ADSL system measured in dBm/Hz, on the reference frequency vector $f_{ref}$, on the electrical length DPBOESEL, and on DBBPO cable parameters A, B, C, according to $$QLN(f_{ref})=PSD_{ADSL}(f_{ref})-(A+B\sqrt{f_{ref}}+Cf_{ref})DPBOE\text{-}SEL++K_1\log_{10}(f_{ref})+K_2, \quad (6)$$

with real-valued constants $K_1$, $K_2$. In the above formula the term $PSD_{ADSL}(f_{ref})-(A+B\sqrt{f_{ref}}+Cf_{ref})$ corresponds to a receive power spectral density of an ADSL signal in a distance $L_{main}$ from the ADSL-CO 320. The term $K_1 \log_{10}(f_{ref})$ corresponds to a coupling factor, due to the near-end-crosstalk 395 from the ADSL cable 330b to the VDSL cable 370, at the point from where the VDSL-CO is connected to the VDSL subscriber device 380, as indicated by the reference numeral 395. Commonly the value $K_1$ is set to 15 to properly model the frequency dependent coupling between two cables. The constant value $K_2$ represents, for example, the amount of active ADSL cables in the cable bundle, that is, the ADSL cables that carry an ADSL signal.

Reformulating the above equation (6) to $$\begin{bmatrix} A+B\sqrt{f_{ref,1}} + C \cdot f_{ref,1} & -1 \\ A+B\sqrt{f_{ref,2}} + C \cdot f_{ref,2} & -1 \\ \vdots & \vdots \\ A+B\sqrt{f_{ref,N}} + C \cdot f_{ref,N} & -1 \end{bmatrix} \cdot \begin{bmatrix} DPBOESEL \\ K_2 \end{bmatrix} = \quad (7)$$

$$\begin{pmatrix} 15 \cdot \log_{10}(f_{ref,1}) + P_{ADSL}(f_{ref,1}) - QLN(f_{ref,1}) \\ 15 \cdot \log_{10}(f_{ref,2}) + P_{ADSL}(f_{ref,2}) - QLN(f_{ref,2}) \\ \vdots \\ 15 \cdot \log_{10}(f_{ref,N}) + P_{ADSL}(f_{ref,N}) - QLN(f_{ref,N}) \end{pmatrix}$$

with $$A = \begin{bmatrix} A+B\sqrt{f_{ref,1}} + C \cdot f_{ref,1} & -1 \\ A+B\sqrt{f_{ref,2}} + C \cdot f_{ref,2} & -1 \\ \vdots & \vdots \\ A+B\sqrt{f_{ref,N}} + C \cdot f_{ref,N} & -1 \end{bmatrix}, \quad (8)$$

$$x = \begin{bmatrix} DPBOESEL \\ K_2 \end{bmatrix}, \text{and} \quad (9)$$

$$b = \begin{pmatrix} 15 \cdot \log_{10}(f_{ref,1}) + P_{ADSL}(f_{ref,1}) - QLN(f_{ref,1}) \\ 15 \cdot \log_{10}(f_{ref,2}) + P_{ADSL}(f_{ref,2}) - QLN(f_{ref,2}) \\ \vdots \\ 15 \cdot \log_{10}(f_{ref,N}) + P_{ADSL}(f_{ref,N}) - QLN(f_{ref,N}) \end{pmatrix}, \quad (10)$$

one can obtain DPBOESEL as the solution of the matrix equation $$A \cdot x = b, \quad (11)$$

where DPBOESEL=x(1). However, it is not necessary to determine the constant $K_2$=x(2).

The above-described method for determining DPBOESEL is valid under the assumption that the exchange side length $L_{main}$ is significantly greater than the length of the distribution cable $L_{dist}$. Under this assumption, adjacent ADSL links have approximately the same bandwidth. Otherwise, the superposition of ADSL-PSDs with different bandwidths would falsify the result obtained by solving the above equation (11).

According to an embodiment of the present invention, the cable parameters A, B, C, can be set to predefined values. It is especially useful to set the parameters to A=0, B=1, C=0. In this case, the loop attenuation $a_{main}(f)$ is approximated by DPBOESEL according to $a_{main}(f)=\sqrt{f} \cdot DPBOESEL$. This prevents a VDSL network provider from configuring the DPBO parameters A, B, C (in G.997.1: A=DPBOESCMA, B=DPBOESCMB, C=DPBOESCMC). Furthermore, $\sqrt{f} \cdot DPBOESEL$ generally is a good approximation for the loop attenuation $a_{main}(f)$ as can also be seen from the aforementioned values for A, B and C.

A further refinement of the inventive method is a restriction to a particular set of frequency points. The crosstalk from the exchange cables 330 might contain other DSL services than ADSL, for example, services like SHDSL, HDSL, ISDN, etc. By restricting the evaluation of DBPOESEL to a frequency vector $$f_{ref}=(f_{ref,1}, f_{ref,2}, \ldots, f_{ref,N})^T, \text{ with } f_u \leq f_{ref,n} \leq f_o \quad (12)$$

it becomes possible to use frequency points which are dominated by a DSL crosstalk in a frequency band between a lower frequency $f_u$ and an upper frequency $f_o$.

In the following, according to further embodiments of the present invention, further ways to determine DPBOESEL from the quiet line noise QLN(f) are described.

According to an embodiment of the present invention, the determination of the information DPBOESEL is based on a maximum useable frequency $f_{max}$ (in G.997.1: MUF) for communications between the ADSL-CO 320 and an ADSL subscriber device 340, and a minimum allowed received power spectral density $P_{min}$ for signals on an ADSL cable 330.

Downstream Power Back-Off is used in frequency ranges in which ADSL and VDSL systems overlay. If an ADSL connection cannot use the complete available bandwidth due to a long line or cable 330 from the ADSL-CO 320 to an ADSL subscriber 340, but only a spectral range up to a maximum frequency $f_{max}$, the shaping of the spectral VDSL downstream transmit power density $PSD_{DPBO}(f)$ is only performed below the maximum frequency $f_{max}$ used by the ADSL system. This maximum frequency $f_{max}$ may be determined based on the distance $L_{main}$ of the ADSL central office 320 from the VDSL central office 360. Although the value of $f_{max}$ depends on the respective scenario, preferably a value may be determined protecting the ADSL system itself under low-noise conditions, i.e. if only a low far-end cross-talk from VDSL lines 370 to ADSL lines 330 occurs. According to the standard G.997, $f_{max}$ or DPBOMUF is defined as the frequency f at which a receive power spectral density of the ADSL system is equal to a minimum required value $PSD_{min}$ according to $$PSD_{min}=PSD_{ADSL}(f)-a_{main}(f). \quad (13)$$

Since the maximum useable frequency $f_{max}$ is the intersection point of $PSD_{ADSL}(f)-(A+B\sqrt{f}+Cf)DPBOESEL$ and the minimum usable signal $PSD_{min}$(cf. G.997.1: DPBOMUS), DPBOESEL can be obtained by solving $$PSD_{min}=PSD_{ADSL}(f_{max})-(A+\sqrt{f_{max}}+C \cdot f_{max}) \cdot DPBOE\text{-}SEL. \quad (14)$$

The maximum useable frequency $f_{max}$ can be either determined from the slope of quiet line noise QLN(f), which is significantly large around the maximum useable frequency $f_{max}$, or from the level of QLN(f) which falls below a threshold for frequencies larger than the maximum useable frequency $f_{max}$, i.e $f > f_{max}$.

According to an embodiment of the present invention, the electrical length DPBOESEL can also be determined by a combination of the aforementioned embodiments of the present invention. For example, a first value $DPBOESEL_1$ for DPBOESEL can be computed by solving the above linear equation system (eq. 11), whereas a second value $DPBOESEL_2$ for DPBOESEL can be determined by determining the maximum useable frequency $f_{max}$ and solving for $DPBOESEL_2$ with the minimum useable signal $PSD_{min}$. Then, a final value for DPBOESEL could be determined by computing a mean value of the first $DPBOESEL_1$ and second value $DPBOESEL_2$ for DPBOESEL.

According to embodiments of the present invention, an automatic determination of DPBOESEL parameter could be invoked by setting an initial value of DPBOESEL to 511 corresponding to 255.5 dB. In this case a VDSL-CO or VDSL transceiver unit does not perform the DPBO with manually set values for the electrical length DPBOESEL, but performs an automatic computation of the parameter DPBOESEL according to embodiments of the present invention.

According to the further embodiments, the automatic determination of DPBOESEL could also be invoked by a use of an additional MIB parameter (MIB=Management Information Base), for example, DBPOAUTO. If the evaluation of the quiet line noise QLN(f) shall be restricted to a frequency vector as described in equation (12), two more MIB parameters are advantageously to be defined. For example, one could use the G.997 parameters DPBOAMIN and DPBOAMAX, to correspond to $f_u$ and $f_o$, from equation (12), respectively. DPBOAMIN and DPBOAMAX thereby correspond to a frequency start- and endpoint of the DPBO, respectively. The DPBOAMIN and DPBOAMAX are preferably expressed in multiples of the VDSL2 frequency spacing, that is, 4.3125 kHz, just like the existing parameters DPBOFMIN and DPBOFMAX from G.997.

Figure 4:
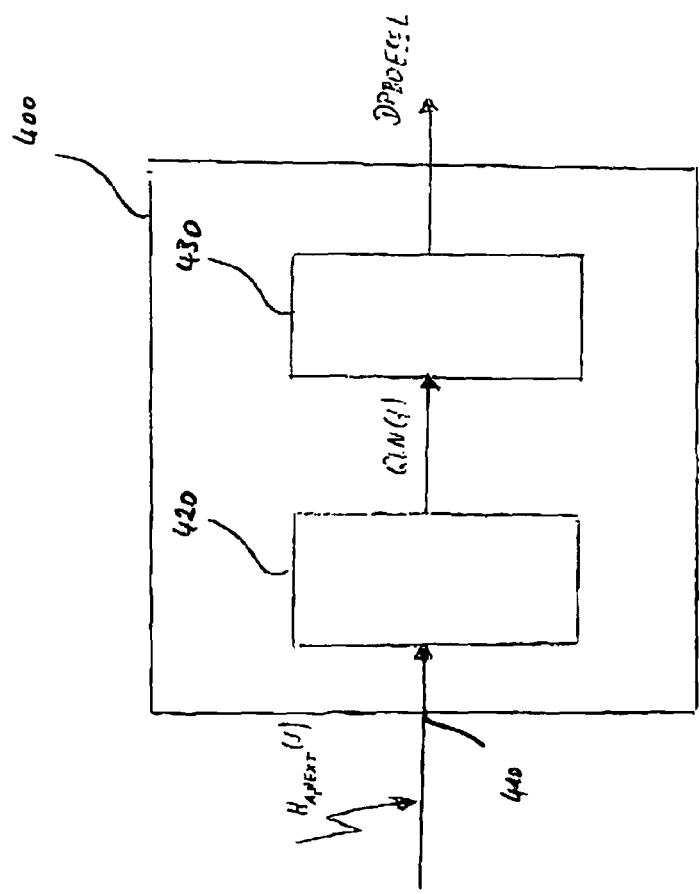
FIG. 4 shows an apparatus for determining an information indicating a length of a part of a first cable according to an embodiment of the present invention.

FIG. 4 shows a device 400 for determining an information DPBOESEL indicating a length $L_{main}$ of a part of an ADSL cable, the ADSL cable connecting a ADSL transceiver unit 310b and a ADSL subscriber device 340b, wherein the part of the ADSL cable 330b extends from the ADSL transceiver 310b unit to a point of the ADSL cable from where a VDSL cable 370 via which a VDSL transceiver unit 350 is connected to a VDSL subscriber device 380, joins the ADSL cable 330b to extend to the VDSL subscriber device 380. The device 400 comprises an input 410 to couple the device 400 to the VDSL cable 370, a first apparatus 420 coupled to the input 410 to measure a quiet line noise QLN(f) related to crosstalk from the ADSL cable 330b to the VDSL cable 370, and a second apparatus 430 to determine information DPBOESEL indicating the length $L_{main}$ of the part of the ADSL cable 330b based on the quiet line noise QLN(f).

The second apparatus 430 to determine information DPBOESEL may, for example, be a processor comprising an input connected to the output of the first apparatus 420 and an output for providing a communication adjustment signal related to communication between the VDSL transceiver 350 and the VDSL subscriber device 380.

As a conclusion, the concept of the present invention provides for an automatic determination of the electrical length parameter DPBOESEL by a VDSL-CO or VDSL transceiver unit. Hence, it is an advantage of embodiments of the present invention that, due to an automatic determination of DPBOESEL, costs can be reduced for a VDSL network operator, since the DPBOESEL parameter does not need to be configured manually, for example, by a service technician, anymore. In many cases, due to a lack of a suitable database, the network operator does not have the correct or optimal DPBOESEL parameter at hand. In such a case, embodiments of the present invention provide a way to determine a suitable value for the DPBOESEL.

The DBPOESEL parameter of the VDSL- or VDSL2-DPBO can now be determined from a measurement and need not to be known by the network operator anymore. The inventive concept proposes an automatic determination of DPBOESEL which can be implemented, for example, in a modified initialization protocol of the VDSL2 channel discovery phase.

In particular, it is to be noted that, depending on the circumstances, the inventive scheme may also be implemented in software stored on a digital storage medium, for example a floppy disc or a CD, or other suitable form of electronically readable media configured to cooperate with a programmable computer system so that the corresponding method is performed. In general, the invention does also consist in a computer program product having a program code stored on a machine-readable carrier for performing the inventive method when the computer program product runs on a computer. In other words, the invention may thus be realized as a computer program having a program code for performing the method, when the computer program product runs on a computer.

Further, it is to be noted that the steps in FIG. 2 may also be implemented in the VDSL-CO, for example as software in FPGA or as ASIC circuit component.

Also, the embodiments where described regarding VDSL communication, other embodiments may relate to any other type of data communication, for example to other xDSL communications like ADSL or HDSL, which may again be combined with any other type of data communication, like, for example, other types of xDSL communications.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An arrangement for determining information indicating a length of a part of a first cable, the first cable connecting a first transceiver unit and a first subscriber device, wherein the part of the first cable extends from the first transceiver unit to a point of the first cable from where a second cable via which a second transceiver unit is connected to a second subscriber device, joins the first cable to extend to the second subscriber device, the arrangement comprising:
an input to couple to the second cable;
a first apparatus coupled to the input to measure a quiet line noise related to crosstalk from the first cable to the second cable; and
a second apparatus to determine information indicating the length of the part of the first cable based on the quiet line noise.

2. The arrangement according to claim 1, wherein the information indicating a part of a length is the electrical length from the first transceiver unit to the point of the first cable.

3. The arrangement according to claim 1, wherein the second apparatus determines the information based on information of a power spectrum of the first transceiver unit coupled to the first cable.

4. The arrangement according to claim 3, wherein the second apparatus determines the information based on solving an equation system according to $$\begin{bmatrix} A+B\sqrt{f_{ref,1}}+C\cdot f_{ref,1} & -1 \\ A+B\sqrt{f_{ref,2}}+C\cdot f_{ref,2} & -1 \\ \vdots & \vdots \\ A+B\sqrt{f_{ref,N}}+C\cdot f_{ref,N} & -1 \end{bmatrix} \cdot \begin{bmatrix} DPBOESEL \\ K \end{bmatrix} =$$

$$\begin{pmatrix} 15\cdot \log_{10}(f_{ref,1})+P_{ADSL}(f_{ref,1})-QLN(f_{ref,1}) \\ 15\cdot \log_{10}(f_{ref,2})+P_{ADSL}(f_{ref,2})-QLN(f_{ref,2}) \\ \vdots \\ 15\cdot \log_{10}(f_{ref,N})+P_{ADSL}(f_{ref,N})-QLN(f_{ref,N}) \end{pmatrix}$$

where A, B, C correspond to cable-model parameters, DPBOESEL corresponds to the information indicating the part of the cable length, $f_{ref}=(f_{ref,1}, f_{ref,2}, \ldots, f_{ref,N})^T$ corresponds to a reference frequency vector of a plurality of reference frequencies, $P_{ADSL}(f_{ref,n})$ corresponds to the power spectrum of the first transceiver unit at a given reference frequency $f_{ref,n}$, $QLN(f_{ref,n})$ corresponds to the quiet line noise at a given reference frequency $f_{ref,n}$ and K corresponds to a constant value.

5. The arrangement according to claim 4, wherein A=0, B=1 and C=0.

6. The arrangement according to claim 1, wherein the second apparatus determines the information based on a maximum usable frequency ($f_{max}$) for communication between the first transceiver unit and the first subscriber device and a minimum allowed receive power spectral density ($P_{min}$) for signals on the first cable.

7. The arrangement according to claim 6, wherein the second apparatus determines the maximum usable frequency ($f_{max}$) from a slope of the quiet line noise, and the information (DPBOESEL) indicating the part of the length of the first cable is determined by solving the following equation:

$$PSD_{min}=PSD_{ADSL}(f_{max})-(A+\sqrt{f_{max}}+C\cdot f_{max})\cdot DPBOESEL.$$

8. The arrangement according to claim 6, wherein the second apparatus determines the maximum usable frequency ($f_{max}$) from a predefined level of the quiet line noise which falls below a threshold for frequencies greater than the maximum usable frequency ($f_{max}$).

9. The arrangement according to claim 1, wherein the first apparatus is configured to measure the power spectrum of quiet line noise during a O-P-Quiet stage of a channel discovery phase between the second transceiver unit and the second subscriber device.

10. The arrangement according to claim 1, wherein the information is determined based on information of a power spectrum of the first transceiver unit coupled to the first cable.

11. A DSL transceiver device, comprising:
an input to couple to a first subscriber device;
a first apparatus operably coupled to the input to measure a power spectrum of quiet line noise, the first apparatus comprising an output to provide information related to the quiet line noise spectrum;
a processor comprising an input operably connected to the output of the first apparatus and an output for providing a communication adjustment signal related to a communication between the DSL transceiver and the first subscriber device,
wherein the processor is configured to determine information indicating a part of a length of a second cable, the second cable connecting a second transceiver unit and a second subscriber device, wherein the part of the second cable length extends to a point of the second cable from where the DSL transceiver unit is connected to the first subscriber device via a first cable.

12. The DSL transceiver device according to claim 11, wherein the first transceiver unit further comprises a transmission section comprising an output connectable to the first cable, and an input coupled to the output for the communication adjustment signal.

13. The DSL transceiver device according to claim 11, wherein the processor determines information indicating a part of the length of the second cable based on solving an equation system according to $$\begin{bmatrix} A+B\sqrt{f_{ref,1}}+C\cdot f_{ref,1} & -1 \\ A+B\sqrt{f_{ref,2}}+C\cdot f_{ref,2} & -1 \\ \vdots & \vdots \\ A+B\sqrt{f_{ref,N}}+C\cdot f_{ref,N} & -1 \end{bmatrix} \cdot \begin{bmatrix} DPBOESEL \\ K \end{bmatrix} =$$

$$\begin{pmatrix} 15\cdot \log_{10}(f_{ref,1})+P_{ADSL}(f_{ref,1})-QLN(f_{ref,1}) \\ 15\cdot \log_{10}(f_{ref,2})+P_{ADSL}(f_{ref,2})-QLN(f_{ref,2}) \\ \vdots \\ 15\cdot \log_{10}(f_{ref,N})+P_{ADSL}(f_{ref,N})-QLN(f_{ref,N}) \end{pmatrix}$$

where A, B, C correspond to cable-model parameters, DPBOESEL corresponds to the information indicating the part of the second cable length, $f_{ref}=(f_{ref,1}, f_{ref,2}, \ldots, f_{ref,N})^T$ corresponds to the reference frequency vector of the plurality of reference frequencies, $P_{ADSL}(f_{ref,n})$ corresponds to a power spectrum of the second transceiver unit at a given reference frequency $f_{ref,n}$, $QLN(f_{ref,n})$ corresponds to a quiet line noise at a given reference frequency $f_{ref,n}$ and K corresponds to a constant value.

14. The DSL transceiver device according to claim 13, wherein A=0, B=1 and C=0.

15. The DSL transceiver device according to claim 11, wherein a determination of an information (DPBOESEL) by the processor, the information indicating a part of a length of a second cable, the second cable connecting a second transceiver unit and a second subscriber device, wherein the part of the second cable length extends to a point of the second cable from where the first transceiver unit is connected to the first subscriber device via the first cable, is based on a maximum usable frequency ($f_{max}$) for communication between the second transceiver unit and the second subscriber device and a minimum allowed receive power spectral density ($P_{min}$) for signals on the second cable.

16. The DSL transceiver device according to claim 15, wherein the maximum usable frequency ($f_{max}$) is determined from a slope of a quiet line noise (QLN(f)) present on the first cable in the absence of signals between the first transceiver unit and the first subscriber device due to a crosstalk from the second cable to the first cable at the point from where the first transceiver unit is connected to the first subscriber device, and the information (DPBOESEL) indicating the part of the length of the second cable is determined by solving the following equation:

$$PSD_{min}=PSD_{ADSL}(f_{max})-(A+\sqrt{f_{max}}+C\cdot f_{max})\cdot DPBOESEL.$$

17. The DSL transceiver unit according to claim 13, wherein the maximum usable frequency ($f_{max}$) is determined from a predefined level of the quiet line noise (QLN(f)) present on the first cable in the absence of signals between the first transceiver unit and the first subscriber device due to a crosstalk from the second cable to the first cable at the point from where the first transceiver unit is connected to the first subscriber device, wherein the level falls below a threshold for frequencies greater than the maximum usable frequency ($f_{max}$).

18. The DSL transceiver device according to claim 11, wherein the processor is configured to determine the information based on information of a power spectrum of the second transceiver unit coupled to the second cable.

19. The DSL transceiver device according to claim 18, wherein the first apparatus is configured to measure the power spectrum of quiet line noise during an O-P-Quiet stage of a channel discovery phase between the DSL transceiver unit and the first subscriber device.

20. A network, comprising:
a first transceiver unit coupled to a first subscriber device via a first cable of a cable bundle and comprising a first transmit power spectrum;
a second transceiver unit coupled to a cable bundle location between the first transceiver unit and the first subscriber device via a second cable of the cable bundle to a second subscriber device, wherein the second transceiver unit comprises an input to couple the second transceiver unit to the second subscriber device, a first apparatus coupled to the input to measure a power spectrum of quiet line noise, the first apparatus comprising an output to provide information related to the quiet line noise spectrum, and a processor comprising an input connected to the output of the first apparatus and an output for providing a communication adjustment signal related to a communication between the second transceiver unit and the second subscriber device,
wherein the processor is configured to determine first information indicating a length of a part of the first cable that extends between the first transceiver unit and the cable bundle location based on the measured power spectrum of quiet line noise.

21. The network according to claim 20, wherein the processor determines the first information based on an information on a power spectrum ($P_{ADSL}(f)$) of the first transceiver unit.

22. The network according to claim 21, wherein the processor determines the first information based on solving an equation system according to $$\begin{bmatrix} A+B\sqrt{f_{ref,1}} + C \cdot f_{ref,1} & -1 \\ A+B\sqrt{f_{ref,2}} + C \cdot f_{ref,2} & -1 \\ \vdots & \vdots \\ A+B\sqrt{f_{ref,N}} + C \cdot f_{ref,N} & -1 \end{bmatrix} \cdot \begin{bmatrix} DPBOESEL \\ K \end{bmatrix} =$$

$$\begin{pmatrix} 15 \cdot \log_{10}(f_{ref,1}) + P_{ADSL}(f_{ref,1}) - QLN(f_{ref,1}) \\ 15 \cdot \log_{10}(f_{ref,2}) + P_{ADSL}(f_{ref,2}) - QLN(f_{ref,2}) \\ \vdots \\ 15 \cdot \log_{10}(f_{ref,N}) + P_{ADSL}(f_{ref,N}) - QLN(f_{ref,N}) \end{pmatrix}$$

where A, B, C correspond to cable-model parameters, DPBOESEL corresponds to the information indicating the part of the cable length, $f_{ref}=(f_{ref,1}, f_{ref,2}, \ldots, f_{ref,N})^T$ corresponds to a reference frequency vector of a plurality of reference frequencies, $P_{ADSL}(f_{ref,n})$ corresponds to the power spectrum of the first transceiver unit at a given reference frequency $f_{ref,n}$, $QLN(f_{ref,n})$ corresponds to the quiet line noise at a given reference frequency $f_{ref,n}$ and K corresponds to a constant value.

23. The network according to claim 22, wherein A=0, B=1 and C=0.

24. The network according to claim 20, wherein the processor determines the first information based on a maximum usable frequency for communication between the first transceiver unit and the first subscriber device and a minimum allowed receive power spectral density for signals on the first cable.

25. The network according to claim 24, wherein the processor determines the maximum usable frequency from a slope of the quiet line noise, and the information indicating the part of the length of the first cable is determined by solving the following equation:

$$PSD_{min}=PSD_{ADSL}(f_{max})-(A+\sqrt{f_{max}}+C \cdot f_{max}) \cdot DPBOESEL.$$

26. The network according to claim 24, wherein the maximum usable frequency is determined from a predefined level of the quiet line noise which falls below a threshold for frequencies greater than the maximum usable frequency.

27. The network according to claim 20, wherein the network is a wire-bonded network.

28. The network according to claim 27, wherein the network is a xDSL network.

29. The network according to claim 27, wherein the network is a combined ADSL/VDSL network.

30. The network of claim 16, wherein the processor is configured to determine the information based on information of a power spectrum of the first transceiver unit coupled to the first cable.

31. The network according to claim 30, wherein the first apparatus is configured to measure the power spectrum of quiet line noise during a O-P-Quiet stage of a channel discovery phase between the second transceiver unit and the second subscriber device.

32. The method of claim 31, wherein the power spectrum of quiet line noise is measured during a O-P-Quiet stage of a channel discovery phase between the first transceiver unit and the first subscriber device.

33. A method for determining information indicating a length of a part of a first cable, the first cable connecting a first transceiver unit and a first subscriber device, wherein the part of the first cable extends from the first transceiver unit to a point of the first cable from where a second cable via which a second transceiver unit is connected to a second subscriber device, joins the first cable to extend to the second subscriber device, the method comprising:
measuring a quiet line noise in the second cable, the quiet line noise related to crosstalk from the first cable to the second cable; and
determining the information indicating the length of the part of the first cable based on the quiet line noise.

34. The method according to claim 33, wherein the information indicating a part of a length includes the electrical length from the first transceiver unit to the point of the first cable.

35. The method according to claim 34, wherein the step of determining the information is based on a maximum usable frequency for communication between the first transceiver unit and the first subscriber device and a minimum allowed receive power spectral density for signals on the first cable.

36. The method according to claim 35, wherein the maximum usable frequency is determined from a slope of the quiet line noise, and the information indicating the part of the length of the first cable is determined by solving the following equation:

$$PSD_{min} = PSD_{ADSL}(f_{max}) - (A + \sqrt{f_{max}} + C \cdot f_{max}) \cdot DPBOESEL.$$

37. The method according to claim 35, wherein the maximum usable frequency is determined from a predefined level of the quiet line noise which falls below a threshold for frequencies greater than the maximum usable frequency.

38. The method according to claim 33, wherein in the step of determining the information an information based on information of a power spectrum of the first transceiver unit coupled to the first cable is used.

39. The method according to claim 38, wherein the step of determining the information is performed by solving an equation system according to $$\begin{bmatrix} A + B\sqrt{f_{ref,1}} + C \cdot f_{ref,1} & -1 \\ A + B\sqrt{f_{ref,2}} + C \cdot f_{ref,2} & -1 \\ \vdots & \vdots \\ A + B\sqrt{f_{ref,N}} + C \cdot f_{ref,N} & -1 \end{bmatrix} \cdot \begin{bmatrix} DPBOESEL \\ K \end{bmatrix} =$$

$$\begin{pmatrix} 15 \cdot \log_{10}(f_{ref,1}) + P_{ADSL}(f_{ref,1}) - QLN(f_{ref,1}) \\ 15 \cdot \log_{10}(f_{ref,2}) + P_{ADSL}(f_{ref,2}) - QLN(f_{ref,2}) \\ \vdots \\ 15 \cdot \log_{10}(f_{ref,N}) + P_{ADSL}(f_{ref,N}) - QLN(f_{ref,N}) \end{pmatrix}$$

where A, B, C correspond to cable-model parameters, DPBOESEL corresponds to the information indicating the part of the cable length, $f_{ref} = (f_{ref,1}, f_{ref,2}, \ldots, f_{ref,N})^T$ corresponds to a reference frequency vector of a plurality of reference frequencies, $P_{ADSL}(f_{ref,n})$ corresponds to the power spectrum of the first transceiver unit at a given reference frequency $f_{ref,n}$, $QLN(f_{ref,n})$ corresponds to the quiet line noise at a given reference frequency $f_{ref,n}$ and K corresponds to a constant value.

40. The method according to claim 39, wherein A=0, B=1 and C=0.

41. The method of claim 33, wherein the information is determined based on information of a power spectrum of the first transceiver unit coupled to the first cable.

42. A computer program product comprising a program code stored on a computer readable storage medium, the program code for performing, when the computer program runs on a computer, a method for determining information indicating a length of a part of a first cable, the first cable connecting a first transceiver unit and a first subscriber device, wherein the part of the first cable extends from the first transceiver unit to a point of the first cable from where a second cable via which a second transceiver unit is connected to a second subscriber device, joins the first cable to extend to the second subscriber device, comprising:
  measuring a quiet line noise related to crosstalk from the first cable to the second cable; and
  determining the information indicating the length of the part of the first cable based on the quiet line noise.

43. The computer program product according to claim 42, wherein the program code is implemented such that in the method the determination of the information is performed by solving an equation system according to $$\begin{bmatrix} A + B\sqrt{f_{ref,1}} + C \cdot f_{ref,1} & -1 \\ A + B\sqrt{f_{ref,2}} + C \cdot f_{ref,2} & -1 \\ \vdots & \vdots \\ A + B\sqrt{f_{ref,N}} + C \cdot f_{ref,N} & -1 \end{bmatrix} \cdot \begin{bmatrix} DPBOESEL \\ K \end{bmatrix} =$$

$$\begin{pmatrix} 15 \cdot \log_{10}(f_{ref,1}) + P_{ADSL}(f_{ref,1}) - QLN(f_{ref,1}) \\ 15 \cdot \log_{10}(f_{ref,2}) + P_{ADSL}(f_{ref,2}) - QLN(f_{ref,2}) \\ \vdots \\ 15 \cdot \log_{10}(f_{ref,N}) + P_{ADSL}(f_{ref,N}) - QLN(f_{ref,N}) \end{pmatrix}$$

where A, B, C correspond to cable-model parameters, DPBOESEL corresponds to the information indicating the part of the cable length, $f_{ref} = (f_{ref,1}, f_{ref,2}, \ldots, f_{ref,N})^T$ corresponds to a reference frequency vector of a plurality of reference frequencies, $P_{ADSL}(f_{ref,n})$ corresponds to the power spectrum of the first transceiver unit at a given reference frequency $f_{ref,n}$, $QLN(f_{ref,n})$ corresponds to the quiet line noise at a given reference frequency $F_{ref,n}$ and K corresponds to a constant value.

44. The computer program product according to claim 42, wherein the program code is implemented such that in the method the determination of the information (DPBOESEL) is performed by solving $$PSD_{min} = PSD_{ADSL}(f_{max}) - (A + \sqrt{f_{max}} + C \cdot f_{max}) \cdot DPBOESEL,$$

where A, B, C correspond to cable-model parameters, $f_{max}$ is a maximum usable frequency for communication between the first transceiver unit and the first subscriber device and $P_{min}$ is a minimum allowed receive power spectral density for signals on the first cable.

* * * * *